United States Patent [19]
Olson

[11] 3,915,857
[45] Oct. 28, 1975

[54] METHOD AND APPARATUS FOR CONSERVING WATER

[76] Inventor: Winston O. Olson, 412 Hilton Drive, Madison, Wis. 53711

[22] Filed: Jan. 18, 1974

[21] Appl. No.: 434,657

[52] U.S. Cl. ............ 210/62; 210/73; 210/104; 210/138; 210/196; 210/257; 210/275
[51] Int. Cl.² ............ C02B 3/08; C02C 1/40
[58] Field of Search ............ 210/15, 60, 62, 64, 80, 210/82, 104, 138–140, 152, 167–169, 196, 220, 252, 257, 264, 266, 275, 284, 73; 4/10, 115

[56] References Cited
UNITED STATES PATENTS

| | | | |
|---|---|---|---|
| 3,318,449 | 5/1967 | Jennings et al. | 210/104 |
| 3,421,835 | 1/1969 | McCarty | 210/167 X |
| 3,440,669 | 4/1969 | Boester | 210/220 X |
| 3,483,983 | 12/1969 | Lindstrom | 210/167 |
| 3,502,215 | 3/1970 | Cahan | 210/167 |
| 3,515,278 | 6/1970 | Wilson | 210/152 X |
| 3,543,294 | 11/1970 | Boester | 210/15 |
| 3,550,778 | 12/1970 | Kesselman | 210/167 |
| 3,679,053 | 7/1972 | Koulovatos et al. | 210/104 X |
| 3,807,565 | 4/1974 | Langston et al. | 210/220 X |

*Primary Examiner*—Samih N. Zaharna
*Assistant Examiner*—Robert H. Spitzer
*Attorney, Agent, or Firm*—Howard W. Bremer

[57] ABSTRACT

A method and apparatus for conserving water in household and like systems comprising collecting household "white water", cycling said white water repeatedly through at least one filter medium capable of removing suspended solids and at least a portion of the dissolved organic material carried by such white water until substantially all undissolved solids are removed and substantially fresh water clarity has been established in the white water and supplying the repeatedly filtered water to the household system for reuse therein.

12 Claims, 6 Drawing Figures

FROM RECYCLE PUMP

METHOD AND APPARATUS FOR CONSERVING WATER

This invention relates to a method and apparatus for conserving water.

More particularly, this invention relates to a method and apparatus for recycling certain waste waters in household and like systems.

It is anticipated that unless drastic conservation measures begin to be practiced efforts to provide fresh water will, within the foreseeable future, fall short of anticipated needs. Although some efforts at water conservation are being made in certain "water-critical" areas such efforts are generally industry-oriented and are very often the fall-out benefit of pollution control measures. No real effort has been made, however, to practice serious water conservation at the household level.

It is a major object of this invention to provide means for effecting a substantial saving of the water used in the household.

A further object is to provide water-handling means within the household which will significantly contribute to pollution control.

Household waste waters are classifiable into two significantly different categories – "black water" and "white water". Black water includes the effluent from sanitary facilities, such as toilets and the like, and where a high undissolved solids content is encountered, such as from a food waste grinder. All other effluent, such as that from laundry facilities, bath, shower, or wash basin, can be considered white water.

Broadly the concept of this invention lies in the provision of a method and apparatus which will permit repeated re-use of white water within the household system. Obviously, white water cannot be re-used directly whether or not it is pathogen-free, unless it is perhaps used for lawn watering. Such direct re-use within the household system is psychologically and esthetically unpleasing and is simply not acceptable today. Hence, it is proposed to subject the white water to intensive filtration within the household unit to remove substantially all undissolved solids and further, to employ filter media which will permit the removal of at least a portion of dissolved organic material as well, prior to reuse. The filtration in all cases should be sufficient to establish substantially fresh water clarity in the filtered white water and thus make it esthetically acceptable for re-use.

White-water treated in accordance with this invention is generally intended for re-use within the household where ingestion, as in the preparation of food and for drinking purposes, is not specifically intended. However, where the water is pathogen-free, such as when the domestic water supply is obtained from a chlorinated source or where chlorine treatment is carried out in conjunction with the filtration operation, the filtered white-water may be ingested with generally no adverse effect.

This invention will be better understood by referring to the attached drawings in conjunction with the following discussion where:

Figure 1:
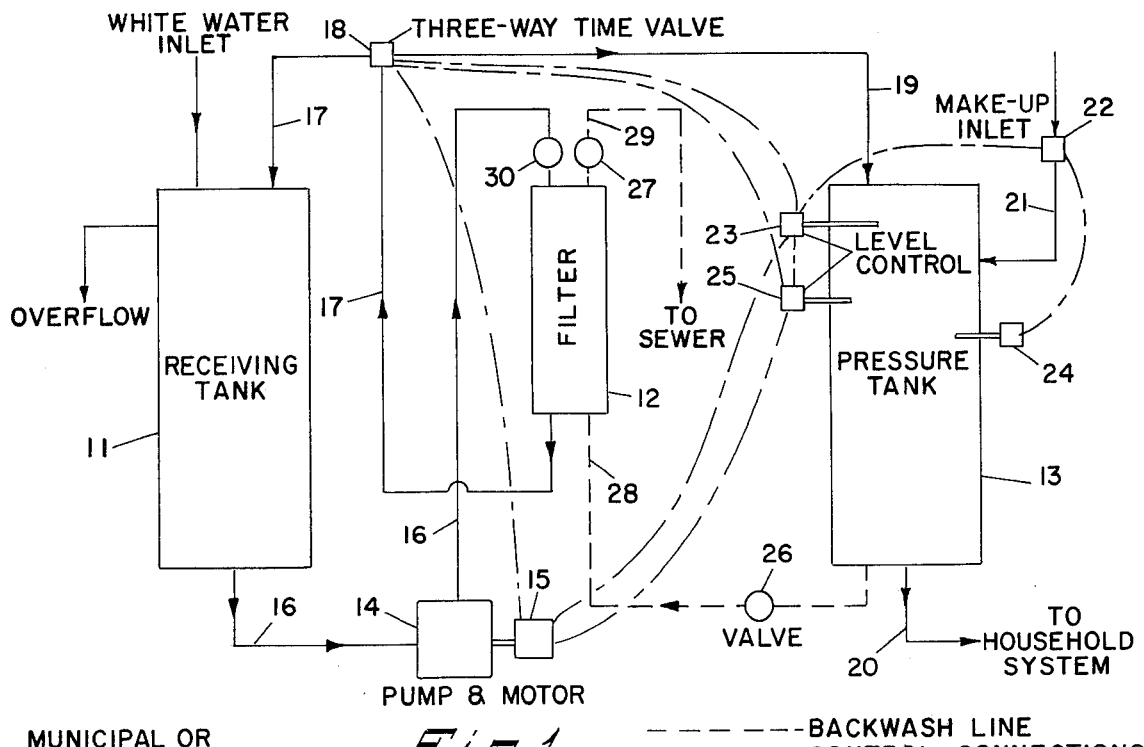
FIG. 1 is a schematic diagram representing a filtration apparatus suitable to carry out the process of this invention.

Referring to FIG. 1, wherein the arrows shown the direction of water flow, a receiving tank for receiving and holding white water effluent is shown at 11. Tank 11 is connected through pump 14, operated by motor 15, to filter tank 12 by feed line 16 and by return line 17 which passes through the three-way valve 18. Line 17 is also connected through three-way valve 18 to line 19 which in turn is connected to pressure tank 13. Pressure tank 13 is connected to the household system through line 20. The domestic water supply is connected to pressure tank 13 via line 21 and valve 22.

In operation, white water effluent from its various sources in the household flows or is pumped (as from a washing machine) into receiving tank 11 which is maintained at atmospheric pressure. This white water is then pumped by pump 14 through line 16, through filter element 12 and back to tank 11 through line 17 and the three-way time valve 18. The pumping through the filter element is continued until substantially freshwater clarity has been obtained in the white water. The three-way valve 18 can be set to recycle the water on a timed basis (clock operation) as indicated until fresh-water clarity has been achieved. (Alternatively, the water clarity can be measured by means well known in the art and an appropriate signal output from such means can be utilized to control the position of valve 18.) At such time, which can vary depending upon the condition of the white water effluent, the valve 18 functions to permit the water to flow through line 19 into pressure tank 13 from whence it is resupplied to the household system via line 20.

Although the tank indicated by 13 has been described as a pressure tank, permitting the resupply to the household system to take place as the result of the air compressed within the tank as it fills with the clarified white water, it may also be operated at atmospheric pressure. In this latter mode it may be elevated to generate enough "head" to adequately resupply the said system or a pump may be used at its outlet for that purpose. In any event, the connection to the household system through line 20 will have to be compatible with the mode of operation of the tank through suitable valving or other mechanicms as is well known in the art. Also, of course, in a pressurized system suitable safety mechanisms, such as pressure relief valves, will have to be supplied.

In the apparatus illustrated in FIG. 1 pressure tank 13 is equipped with a high-water-level control element indicated by 23, a low-water-level control element, indicated by 25, and a make-up level control element indicated by 24. An inlet line for make-up water to be supplied to tank 13 from the domestic supply is shown at 21 with valve 22 in the line controlling the flow of make-up to tank 13.

The high-water-level control element 23 as shown as interconnected with make-up water valve 22, three-way valve 18, low-water-level control element 25 and motor 15 so that when the maximum water level in the pressure tank has been reached level control 23 through appropriate arrangements cause valve 22 to close, if it has been open, and operate three-way valve 18 to close off line 19. The white water will then continue to be circulated by pump 14 from receiving tank 11 through line 16, filter element 12 and line 17 back to the receiving tank. Then, when water usage has caused the level in pressure tank 13 to drop below low-water-level control element 25, that element causes three-way valve 18 to be activated to again permit clarified white water to be pumped through line 19 into the pressure tank.

Alternatively or in addition, the motor 15 can be caused to shut down by interconnections between control 23, control 25, motor 15 and valve 18 until low-water-level control element 25 in the pressure tank again "calls for" water to be admitted to that tank at which time the motor is again turned on.

In the event that, for whatever reason, there is insufficient water in the receiving tank, e.g. where there has been extremely heavy outdoor use of water where no recycling is possible, and the water level in pressure tank 13 drops below make-up water control element 24, this element functions to open valve 22 and permit water from the domestic supply to flow into tank 13.

With the apparatus illustrated it is to be appreciated that provision will have to be made in all cases to permit sufficient recycling of the white water to achieve substantially fresh-water clarity before it is allowed to flow into the pressure tank. Therefore, regardless of the demand for clarified white water resulting from activation of the low-water-level control element, the time control (or equivalent method of control) of the three-way valve must override such demand until sufficient clarification of the white water has been achieved.

It will be obvious to those skilled in the art that various other control and valve arrangements are possible.

The apparatus in FIG. 1 is also shown as having a manually operated filter back-wash feature although it is obvious that various means and methods for automatically controlling the back-washing can be employed. When back-washing of the filter element is desired the pump and motor are shut off, valves 26 and 27 are opened and water from the pressure tank flows through valve 26 and line 28 through filter element 12 and out line 29 through valve 27 to the sewer. It is understood, of course, that line 16 would be equipped with a check valve 30 to prevent the back-wash from flowing back through line 16.

Figure 3:
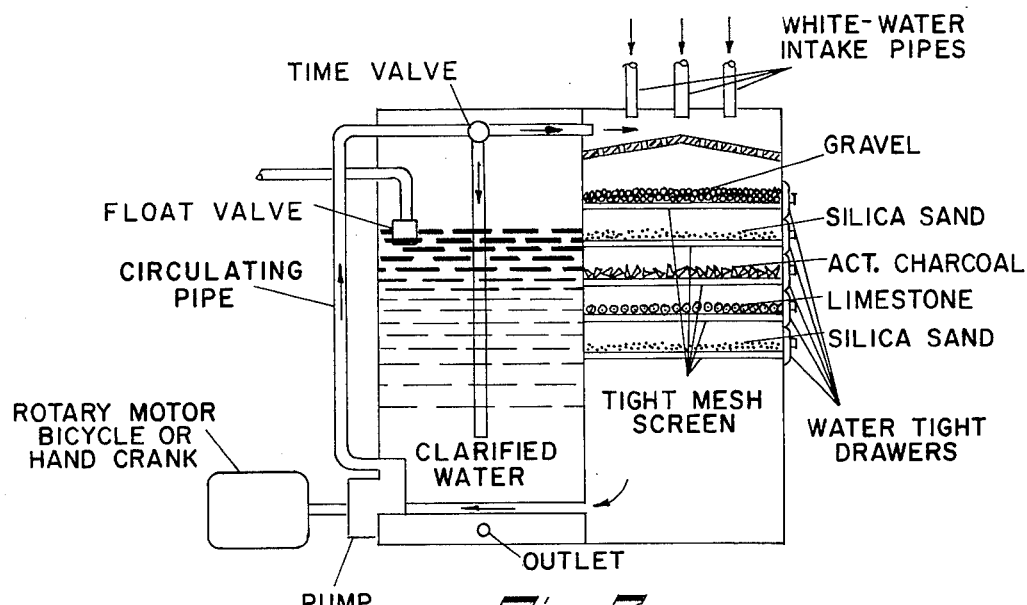
FIG. 3 is a cross-sectional schematic diagram of one alternative form of the filtration apparatus of this invention where the diverse filter media illustrated can be individually replaced as needed.

The filter element 12 may contain diverse filter media, for example, as shown in FIG. 3, but in all cases activated carbon should be present in substantial amount to remove at least a portion of the dissolved organic material in the white water and may in fact comprise the only filtering medium present. Local water conditions will provide the necessary criteria for the filter media which are to be used. Preferably, layered fine sand, such as silica sand, and activated carbon comprise the filtering media with the sand layer located at the white water inlet to the filter element and with the activated carbon below. The layers of filter media can be supported by fine wire mesh or perforated plates or the filter bed can have materials graduated in size from the coarsest at the bottom of the filter element to the finest at the top so that each layer supports the next layer above it without permitting a wash out of the finer material by the water flowing through the filter element. The layering of filter media is well understood and well known in the art.

The presence of activated carbon in the filter element is essential to the realization of the desired ends of this invention, i.e. to restore the white water to a state of fresh-water clarity. The ability of activated carbon to remove many odors, colors and flavors from water is well known and it is this characteristic as applied in the present invention which permits the white water to be returned to an esthetically and psychologically unobjectionable state. Various of the activated carbons sold by Westvaco, Chemical Division, Covington, Va., as Nuchar granular activated carbon are suitable for the purposes of this invention.

It will be readily recognized that the apparatus of this invention can be sized depending upon the projected water usage in the location in which it is to be applied. It was found, for example, that for a family of five whose normal water usage was about 360 gallons per day, an apparatus having an 82 gallon receiving tank, an 82 gallon pressure tank and a 40 gallon capacity filter tank about 1 foot in diameter carrying a layered filter bed about 42 inches deep composed of crushed limestone, silica sand and activated carbon all supported on a perforated rigid aluminum plate was more than adequate. The filter medium resting directly on the said plate was about a six inch layer of the crushed limestone, above which was about 18 inches of activated carbon portion of the bed and above that about 18 inches of fine silica sand.

Figure 2:
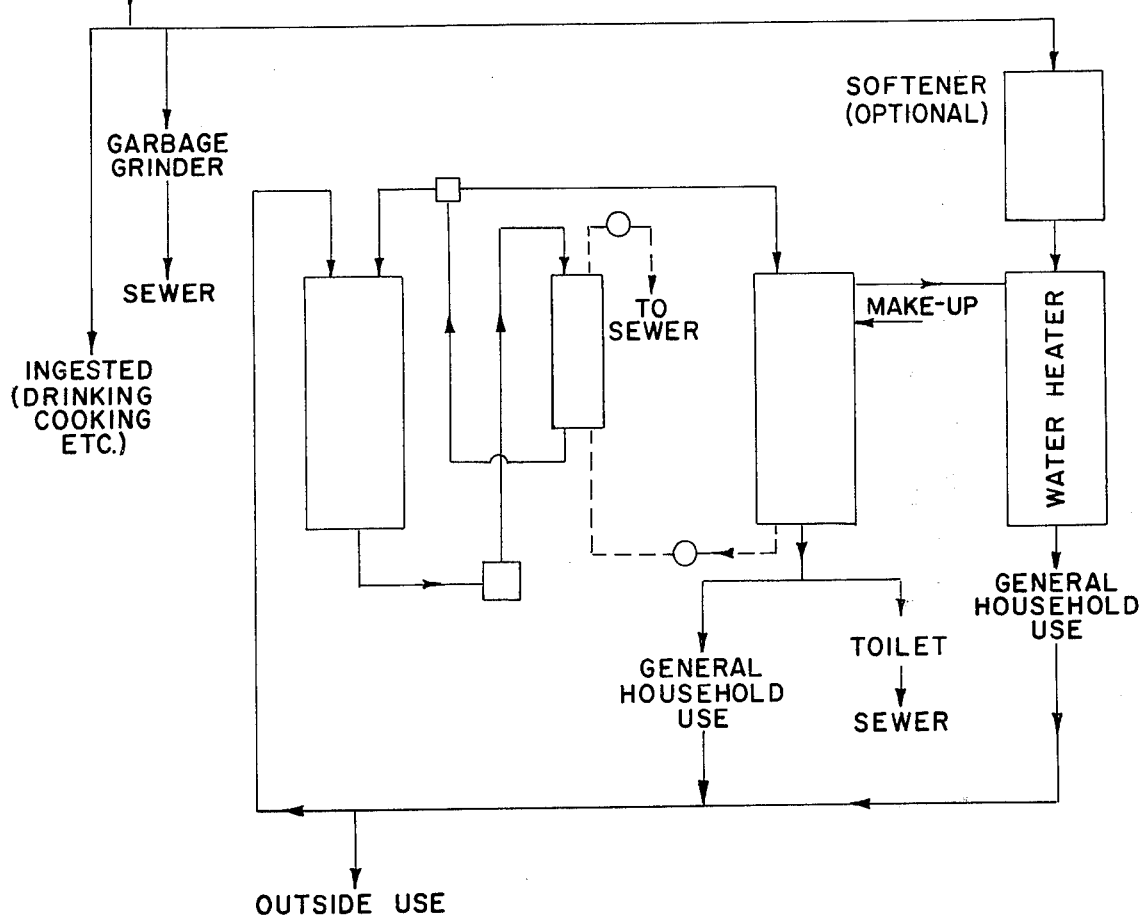
FIG. 2 is a schematic diagram of a typical household plumbing system incorporating the apparatus of FIG. 1 and showing water application and effluent flow.

In use, with a centrifugal pump delivering approximately 20 gpm to the filter element, white water was recirculated in the household substantially in accordance with the flow system shown in FIG. 2. It was found that, excluding the amount of water ingested, about 80% of the daily water need from the domestic supply was saved.

After 12 days of operation as described water samples were submitted to the STate Laboratory of Hygiene for determination of potability. Pathogen counts were unobtainable since the domestic supply was chlorinated. It was considered that the filtered white water was ingestible.

There have been many other suggestions for conservation of water at the household level primary among which have been to re-use certain white-water components for toilet flushing purposes. See, for example, U.S. Pat. No. 3,318,449, issued May 9, 1967. Such suggested water re-use comprises a saving of only about 20% of the water used in a typical household as contrasted with the 80% or greater savings with the present invention. Also, such earlier suggestions have not contemplated clarifying the white water through intensive filtration by multiple recycling through diverse filter media comprising activated carbon as one component to again make it suitable for body contact uses within the household.

It will be apparent that various changes can be made in tank sizes of the apparatus of this invention, as previously suggested, and that other physical arrangements of the system components are possible. Also, adjunct water treating elements can be used, such as water hardness or iron removing components. Then too, if desired, in some circumstances, the hot water heater in the standard household system can be used as the pressure tank. A substantial amount of white water effluent in a household is hot water and particularly where the hot water supply in a household comprises softened water the present system can effect substantial savings over and above water and sewage charge savings.

The present invention also provides additional benefits in contributing to pollution control. It is recognized that there are three major problems in waste water and sewage disposal. These are:

1. The hydraulic problem — sheer excess liquid volume;
2. The pathogen problem — pathogen-containing waste seeping through rock strata into the ground water supply;
3. Nuisance value — closely connected with hydraulic problem.

The hydraulic problem is experienced both with municipal systems and with individual septic systems, particularly in areas with higher density populations. At times the hydraulic problem is so severe that raw sewage must by-pass the treatment plant and be discharged directly into streams or lakes.

It is obvious that the presently suggested recycling system can make an extremely effective contribution to reducing the hydraulic problem in sewage disposal as well as in the attendant nuisance problem. As pointed out above with the prototype installation a reduction in total water usage of about 80% was achieved. And even if we assume an average reduction in water usage of 50%, i.e. 50% less water is sewered from each household, the beneficial impact on the hydraulic problem is self-evident.

In general, widespread application of the recycling apparatus of the present invention will serve to:

1. Extend the operating capabilities of existing sewage treating facilities;
2. Permit more intensive and efficient treatment of sewage in existing facilities;
3. Extend the capability of existing water supply systems to serve a greater population density or a larger area;
4. Minimize or prevent septic tank run-off problems;
5. Help to conserve ground water supplied by permitting reuse of water taken from such source.

All of the foregoing benefits will also reflect substantial cost savings over and above equipment cost amortization and operation.

Figure 4:
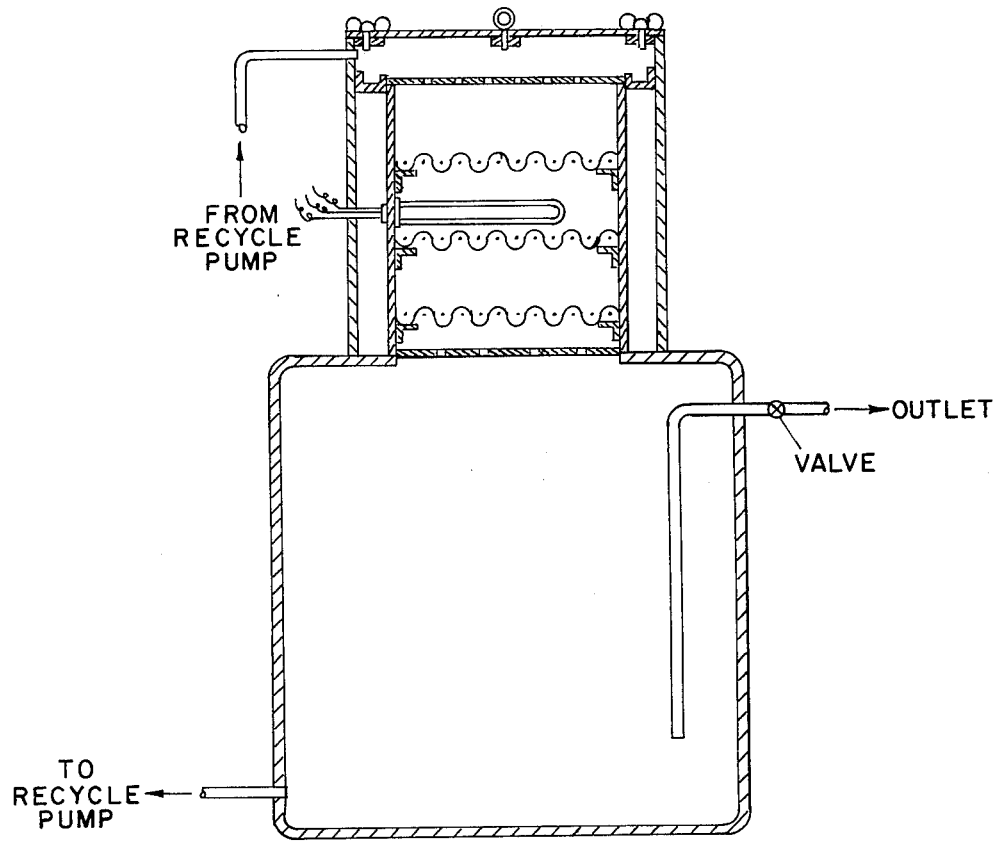
FIG. 4 is a cross-sectional schematic diagram of another alternative filtration apparatus of the present invention with internal heating means in the filter element and where the filter element is removable (filter media not shown).

Referring to FIG. 4 the heating element shown in the filter element of the apparatus depicted suggests the regeneration of the spent activated carbon in situ. The spent carbon, as is well known is readily regenerated by heating at 1600–1800°F. Obviously, suitable precautions would have to be taken in apparatus design to accomplish such ends.

Figure 5A:
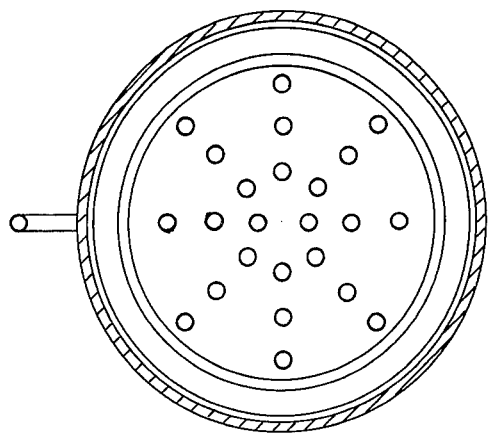
FIG. 5a is a section taken at AA of the filter element of FIG. 5.
Figure 5:
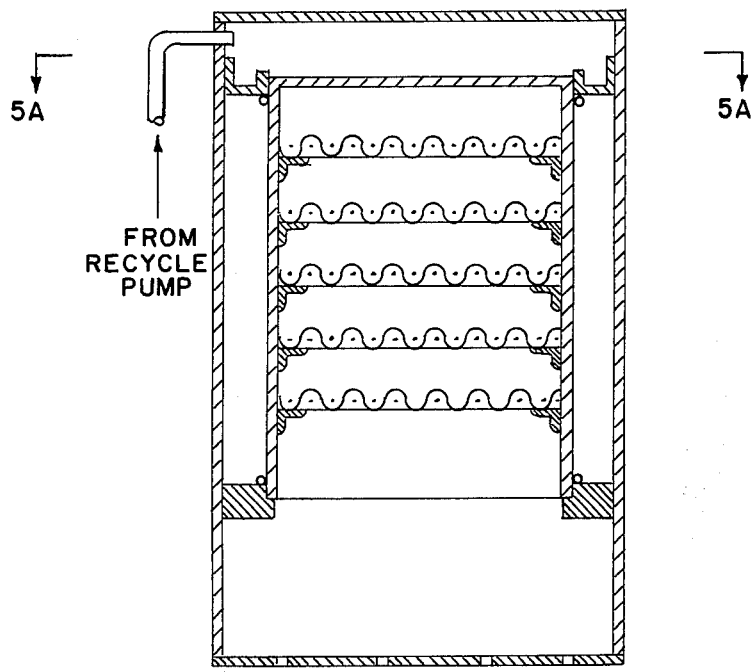
FIG. 5 is a cross-section of an alternative removable filter element which can be used in the apparatus of FIG. 4 (filter media not shown).

Since the activated carbon is regenerable it is apparent that removable filter elements such as shown in FIGS. 4 and 5 would be highly desirable. Such arrangement would permit the collection of the spent activated carbon for return to a central regenerating operation either through periodic removal and replacement of the filter element or, as in the configuration shown in FIG. 3 through replacement of only the activated carbon portion of the filter media in situ.

The present system readily lends itself to applications other than household use. For example, it can be employed as a common recycling system for cluster-concept building, to conserve water in commercial car-washing operations and the like, to extend the capacity of self-service or other laundering operations particularly where the supply of water is limited and as a component of a self-contained water system for vehicles and boats.

Having thus described the invention what is claimed is:

1. A process for conserving water in household or like systems which comprises:
   accumulating and pooling waste waters from the non-sanitary and low-dissolved solids generating components of said system;
   establishing closed-loop recirculation of said accumulated and pooled waste waters through a filter medium comprising activated carbon for a time sufficient to remove substantially all undissolved solids and at least a portion of the dissolved solids carried by said pooled waste waters and impart substantially fresh water clarity to said recirculating waste waters;
   diverting the thus filtered and clarified waste waters from said closed-loop recirculation;
   accumulating said diverted filtered and clarified waste waters; and
   resupplying said system from said accumulated filtered and clarified waste waters.

2. The process of claim 1 wherein chlorine in pathogen-controlling amounts is added to the waste waters prior to establishing closed loop recirculation through the filter medium.

3. The process of claim 1 wherein chlorine in pathogen-controlling amounts is added to the waste waters during closed-loop recirculation through the filter medium.

4. The process of claim 1 wherein chlorine in pathogen-controlling amounts is added to the filtered and clarified waste waters.

5. Apparatus for conserving water in household or like systems which comprises in combination:
   a first receptacle for receiving and accumulating waste waters;
   means for delivering waste waters from the non-sanitary and low undissolved solids generating-components of said system to said first receptacle;
   a second receptacle containing a filter element having diverse filter media, at least one of said media being activated carbon;
   means for recycling said waste water in a closed loop from said first receptacle to said second receptacle and through said filter element back to said first receptacle until substantially fresh water clarity has been established in the waste water;
   means for diverting the filtered and clarified waste water from said loop to a storage receptacle; and
   means for delivering the water from said storage receptacle back into said system.

6. The apparatus of claim 5 wherein said recycling means comprises pump means.

7. The apparatus of claim 6 wherein said storage receptacle is a pressure tank and the filtered and clarified waste water is delivered back into the system by air pressure means.

8. The apparatus of claim 6 wherein the means for diverting the filtered and clarified water to the storage receptacle comprises a time-responsive valve.

9. The apparatus of claim 8 wherein said time-responsive valve is shut-off-responsive to the liquid level in said storage receptacle.

10. The apparatus of claim 9 including a domestic water supply conduit to said storage receptacle and means in said conduit responsive to low water level-sensing means within said storage receptacle to permit the inflow of make-up water into said receptacle and shut-off responsive to a higher water level in said receptacle.

11. The apparatus of claim 9 wherein the storage receptacle comprises a hot water heater in the household system.

12. The apparatus of claim 7 including means for back-washing the filter media.

* * * * *